United States Patent
Zhang et al.

(10) Patent No.: US 9,762,498 B2
(45) Date of Patent: Sep. 12, 2017

(54) LOCALIZED CONGESTION EXPOSURE

(71) Applicant: Telefonaktiebolaget L M Ericsson (publ), Stockholm (SE)

(72) Inventors: Ying Zhang, Fremont, CA (US); Ingemar Johansson, Lulea (SE); Howard Green, San Jose, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/615,385

(22) Filed: Feb. 5, 2015

(65) Prior Publication Data

US 2015/0156120 A1 Jun. 4, 2015

Related U.S. Application Data

(62) Division of application No. 12/976,067, filed on Dec. 22, 2010, now Pat. No. 8,982,694.

(Continued)

(51) Int. Cl.
*H04L 12/801* (2013.01)
*H04L 12/851* (2013.01)
(Continued)

(52) U.S. Cl.
CPC ........ *H04L 47/2483* (2013.01); *H04L 47/115* (2013.01); *H04L 47/12* (2013.01);
(Continued)

(58) Field of Classification Search
CPC ....... H04L 47/12; H04L 12/569; H04L 47/11; H04L 47/10; H04L 12/4633;
(Continued)

(56) References Cited

U.S. PATENT DOCUMENTS 6,741,555 B1 * 5/2004 Li et al. ............. 370/229
8,982,694 B2 3/2015 Zhang et al.
(Continued)

FOREIGN PATENT DOCUMENTS

EP 1873968 A1 1/2008
RU 2256299 C2 7/2005
(Continued)

OTHER PUBLICATIONS

Ramakrishnan, K., et al., "The Addition of Explicit Congestion Notification (ECN) to IP", Network Working Group RFC 3168 (Sep. 2001), pp. 1-63.*

(Continued)

*Primary Examiner* — Salvador E Rivas
(74) *Attorney, Agent, or Firm* — Nicholson De Vos Webster & Elliott LLP

(57) ABSTRACT

A method of localized congestion exposure within a local loop in a cellular network that is performed by a localized congestion exposure sender node of the local loop. The method includes receiving downlink packets that are destined for a downstream user device. The method also includes receiving packets that have feedback indicating a congestion level from a downstream node of the cellular network. The method further includes inserting a declaration of an expected downstream congestion level into headers of the received downlink packets; and forwarding the downlink packets that have the declaration of the expected downstream congestion level inserted into the headers toward the downstream user device.

11 Claims, 9 Drawing Sheets

Related U.S. Application Data

(60) Provisional application No. 61/378,980, filed on Sep. 1, 2010.

(51) Int. Cl.

| | | |
|---|---|---|
| *H04W 52/34* | (2009.01) | |
| *H04L 12/825* | (2013.01) | |
| *H04W 28/02* | (2009.01) | |
| *H04W 28/12* | (2009.01) | |
| *H04L 12/823* | (2013.01) | |
| *H04L 29/12* | (2006.01) | |
| *H04L 12/46* | (2006.01) | |
| *H04W 84/04* | (2009.01) | |

(52) U.S. Cl.
CPC ............ *H04L 47/127* (2013.01); *H04L 47/14* (2013.01); *H04L 47/26* (2013.01); *H04L 47/32* (2013.01); *H04W 28/0231* (2013.01); *H04W 28/0242* (2013.01); *H04W 28/0284* (2013.01); *H04W 28/0289* (2013.01); *H04W 28/12* (2013.01); *H04W 52/343* (2013.01); *H04L 12/4633* (2013.01); *H04L 61/2592* (2013.01); *H04W 84/042* (2013.01)

(58) Field of Classification Search
CPC ............. H04L 61/2592; H04L 47/127; H04W 28/0289; H04W 52/343; H04W 28/0284; H04W 28/028; H04N 21/64738
See application file for complete search history.

(56) References Cited

U.S. PATENT DOCUMENTS

| | | | |
|---|---|---|---|
| 9,445,300 | B2 | 9/2016 | Zhang et al. |
| 2008/0091766 | A1 | 4/2008 | Briscoe et al. |
| 2009/0168680 | A1 | 7/2009 | Singh et al. |
| 2009/0271101 | A1* | 10/2009 | Relyea ................. G08G 1/0104 701/118 |
| 2010/0046512 | A1 | 2/2010 | Xia et al. |
| 2011/0032819 | A1* | 2/2011 | Schliwa-Bertling .... H04L 47/10 370/229 |
| 2011/0075563 | A1 | 3/2011 | Leung et al. |
| 2011/0158096 | A1* | 6/2011 | Leung ................... H04L 1/0079 370/232 |
| 2011/0164503 | A1 | 7/2011 | Yong et al. |
| 2011/0205959 | A1* | 8/2011 | Aalto ...................... H04L 45/00 370/328 |
| 2011/0305138 | A1* | 12/2011 | Huomo .................. H04L 47/10 370/230 |
| 2012/0008521 | A1 | 1/2012 | Moncaster et al. |
| 2012/0016986 | A1* | 1/2012 | Jacquet .................. H04L 47/10 709/224 |
| 2012/0046058 | A1* | 2/2012 | Vesterinen ............ H04W 8/082 455/509 |
| 2012/0120798 | A1 | 5/2012 | Jacquet et al. |

FOREIGN PATENT DOCUMENTS

| | | |
|---|---|---|
| RU | 2313915 C2 | 12/2007 |
| RU | 2008138710 A | 4/2010 |
| WO | 2009/024508 A1 | 2/2009 |

OTHER PUBLICATIONS

Briscoe, Bob, et al., "Policing Congestion Response in an Internetwork using Re-feedback", SIGCOMM'05 Aug. 21-26, 2005, Philadelphia, Pennsylvania, 2005, pp. 1-12.*

"Enhanced UMTS Radio Access Network Extensions fr ns-2, E.U.R.A.N.E.", Description of EURANE, Retrieved from the Internet at http://eurane.ti-wmc.nl/eurane/on05/09/2012, (Oct. 10, 2006), pp. 1-5.

"The Network Simulator ns-c", Retrieved from the Internet at <http://www.isi.edu.nsnam/ns on 05/9/2012>, (1989), 2 pages.

Allman, M. et al., "TCP Congestion Control", RFC 2581, retrieved from the internet at file <:///C.Users/Brent ~l/AppData/Local/Temp/Low/VDM1FAW1.htm>, on May 8, 2012, (1989), 14 pages.

Bagnulo, M. et al., Conex Status Pages, Congestion Exposure (Active WG). Mar. 28, 2012 Charter. Retrieved from the internet at http://tools.ietf.org/wg/conex/charters (Sep. 2008) 2 pages.

Bagnulo, M. et al., "Congestion Exposure (conex) working group", Retrieved from the internet at https://datatracker.ietf.org/wg/conex/character, (Mar. 2011), 2 pages.

Balakrishnan, Hari et al., "A Comparison of Mechanisms for Improving TCP Performance Over Wireless Links", SIGGCOMM '96, Conference proceedings on Applications, technologies, architectures, and protocols for computer communications, New York, NY, USA, (1996), pp. 256-269.

Botta, Alessio et al., "Performance Footprints of Heavy-Users in 3G networks via empirical measurement", in WiNMe 2010, 6th International workshop on Wireless Network Measurements, May 31, 2010, Avignon, France, 6 pages.

Brakmo, Lawrence et al., "TCP Vegas: New Techniques for Congestion Detection and Avoidance", SIGCOMM Comput. and Communication Review, vol. 24, No. 4, (1994), pp. 24-35.

Briscoe, B. et al., "ConEx Concepts and Use Cases; draft-moncaster-conex-concepts-uses-01", Jul. 12, 2010, 29 pages, Internet-Draft, IETF Trust.

Briscoe, B., "Emulating Border Flow Policing using Re-ECN on Bulk Data; draft-briscoe-tsvwg-re-ecn-border-cheat-08", Feb. 27, 2006, 37 pages, The Internet Society.

Briscoe, Bob et al., "Internet: Fairer is Faster", A complete overhaul of how we share Internet capacity is in progress. BT White Paper TR-CRX9-2009-001, (Jun. 7, 2009), pp. 1-7.

Briscoe, Bob et al., "Policing Congestion Response in an Internetwork using Re-feedback", SIGCOMM'05 Aug. 21-26, 2005, Philadelphia, Pennsylvania, 2005, pp. 1-12.

Briscoe, B. et al., "Re-ECN: Adding Accountability for causing congestion to TCP/IP draft-briscoe-tsvwg-re-ecn-tcp-08-", Transport Area Working Group, Internet Engineering Task Force, (Sep. 30, 2009), pp. 1-51.

Briscoe, B. et al., "Re-ECN: A Framework for Adding Congestion Accountability to TCP/IP draft-briscoe-tsvwg-re-ecn-tcp-motivation-01", Transport Area Working Group, Internet Engineering Task Force, (Sep. 18, 2009), pp. 1-53.

Briscoe, Bob et al., "Re-ECN Adding Accountability for causing congestion to TCP/IP draft-briscoe-tsvwg-re-ecn-tcp-09", Retrieved from the internet at http://www/ietf.org.id/draft-briscoe-tsvwg-re-ecn-ecp-09.txt on Dec. 2, 2010. Transport Area Working Group, Internet Engineering Task Force, (Oct. 25, 2010), pp. 1-47.

Briscoe, B. "Tunneling of Explicit Congestion Notification", retrieved from the internet at https://datatracker.ietf.org/wg/conex/charter, (Aug. 26, 2010), pp. 1-42.

Demers, Alan, "Analysis and Simulation of a Fair Queueing Algorithm", in SIGCOMM '89: Symposium proceedings on Communications architectures & protocols, (New York, NY, USA), ACM,, (1989), pp. 1-12.

Diana, Remi et al., "ECN Verbose Mode: A Statistical Method for Network Path Congestion Estimation", Mar. 15, 2010, 5 pages, IEEE INFOCOM 2010 Conference on Computer Communications Workshops.

Floyd, S., "HighSpeed TCP for Large Congestion Windows", RFC 3649, (Dec. 2003), pp. 1-34.

Handley, M. et al., "TCP Friendly Rate Control (TRFC): Protocol Specification", Standard Tracks, (1999), pp. 1-23.

Jacobson, V., "TCP Extensions for High Performance", RFC 1323, (May 1992), 37 pages.

Jacquet, Arnold et al., "Policing Freedom to Use the Internet Resource Pool", in Proc. Workshop on Re-Architecturing the Internet (ReArch '08), pp. 1-6.

Jain, R. et al., "A Quantitative Measure of Fairness and Discrimination for Resource Allocation in Shared Computer System", Eastern Lab Research, Digital Equipment Corporation, (Sep. 26, 1984), pp. 1-38.

(56) References Cited

OTHER PUBLICATIONS

Jin, Chen et al., "Fast TCP: Motivation, Architecture, Algorithms, Performance", IEEE/TCM Trans. Network vol. 14, No. 6, (2004), pp. 2490-2501.
Kelly, Tom "Scalable TCP: Improving Performance in Highspeed Wide Area Networks", SIGCOMM Comput. Communication Rev., vol. 33, No. 2, (2003), pp. 83-91.
Mathis, M et al., "TCP Selective Acknowledgement Options", (1996), pp. 1-12.
Moncaster, T. et al., "The Need for Congestion Exposure in the Internet; draft-moncaster-conex-problem-00", Mar. 1, 2010, 22 pages, Internet-Draft, IETF Trust.
Partridge, C., "Gigabit Networking", Boston, MA, USA: Addison-Wesley Longman Publishing Co., Inc., 1994, ISBN 0-201-56333-9 Book.
R., Kalden et al., "Searching for mobile mice and elephants in GPRS networks", SIGMOBILE Mobile Computing and Communications Review, vol. 8, No. 4, Oct. 2004, pp. 37-46.
Ramakrishnan, K. et al., "The Addition of Explicit Congestion Notification (ECN) to IP", Network Working Group, RFC 3168, (Sep. 2001), pp. 1-63.
Zhang, Yin et al., "Understanding the End-to-End Performance Impact of RED in a Heterogeneous Environment", Department of Computer Science, Cornell University. Ithaca, NY, (2000), 11 pages.

\* cited by examiner

LOCALIZED CONGESTION EXPOSURE

CROSS-REFERENCE TO RELATED APPLICATIONS

This application is a divisional of application Ser. No. 12/976,067, filed Dec. 22, 2010, which claims the benefit of U.S. Provisional Application No. 61/378,980, filed Sep. 1, 2010, which are hereby incorporated by reference.

FIELD

Embodiments of the invention relate to the field of networking; and more specifically, to congestion avoidance in the field of networking.

BACKGROUND

Network congestion may occur when more packets or data are transmitted through a network than the network can accommodate. The network typically has a fixed capacity, such as a fixed bandwidth or a fixed packet transmission rate. When more packets need to be transferred than the fixed capacity of the network, the network may employ queues to buffer the packets to accommodate such traffic surges. However, the network elements generally have queues and other resources of a fix size. The network congestion may occur when these fixed sized resources are nearly or fully utilized (e.g., the queues may be nearly full) and are not able to accommodate additional packet transmissions. Conventionally, networks experiencing such congestion may simply drop packets. However, dropping packets may have certain drawbacks, such as causing retransmission of the dropped packets, which may further contribute to or prolong the network congestion.

Explicit Congestion Notification (ECN) is a known congestion avoidance scheme that involves marking packets instead of dropping them in the case of incipient congestion. An ECN-aware network element experiencing incipient congestion may mark ECN fields in headers of the packets to indicate that the congestion is occurring, instead of dropping the packets. By way of example, ECN may use two least significant bits in the DiffServ field in the IP protocol header (IPv4 or IPv6) which are assigned to the ECN field to encode four different ECN code-points. An ECN code-point of 00 may indicate not ECN-capable transport (i.e., not ECT) if either end-point does not support, or is not willing to support, ECN-capable transport. Either of two ECN code-points, namely 10 or 01 (ECT(0) and ECT(1) respectively), may indicate ECN-capable transport (ECT). An ECN code-point of 11 may indicate that congestion has been experienced or encountered (ECN-CE). For example, an ECN-capable node or queue may probabilistically set the ECN field to 11 if congestion is encountered or experienced and then forward the ECN-marked packet. To avoid heavy congestion, routers and other network elements may mark packets with probability depending on an average queue length. Examples of suitable protocols to specify the feedback for ECN include TCP, DCCP, SCTP, and RTP/UDP. The percentage or proportion of packets marked may be indicative of, and directly related to, the level of congestion in the network. In ECN, an end-point receiver of the ECN-marked packets may return feedback or information about the percentage or proportion of marked packets, or the level of congestion, to the sender in order to inform the sender that the network is experiencing congestion. The sender is expected to decrease its transmit rate so that future packets are not dropped. Advantageously, ECN may help to reduce the amount of congestion in the network and the number of packets that are dropped.

Congestion exposure (ConEx) is another congestion avoidance scheme or protocol. Congestion exposure may use and be built upon ECN. Congestion exposure may provide a mechanism that allows a sender to inform the network about remaining path congestion that is expected to be encountered by packets. In ECN the network may signal congestion by ECN marking packets or by dropping packets and the receiver may pass this information back to the sender as feedback. Congestion exposure builds on this by allowing the sender to relay or insert expected remaining path congestion information back into the network to inform the network of this expected congestion. The expected rest-of-path congestion information may be based on or derived from congestion previously encountered by previous packets in the same flow as indicated in the ECN feedback. The network nodes may use this information to estimate how much congestion the flow is likely to cause by sending or forwarding the traffic and may make decisions based on this information. Congestion exposure may provide the information and ability to make flows accountable for the congestion that they cause, or allow to be caused, and may help to manage congestion.

Re-ECN is a known implementation of congestion exposure. Re-ECN is described in the Transport Area Working Group Internet Engineering Task Force (IETF) Internet-Draft entitled "*Re-ECN: Adding Accountability for Causing Congestion to TCP/IP*," by Bob Briscoe et al., dated Oct. 25, 2010, pages 1-51. The re-ECN protocol provides a field in each packet so that, as the packet crosses any interface in an internetwork, it carries a truthful prediction of congestion on the remainder of its path.

SUMMARY

In one aspect, a method for localized congestion exposure within a local loop in a cellular network performed by a localized congestion exposure receiver node of the local loop includes several steps. In one step, downlink packets destined for a downstream user device are received. The downlink packets have headers that indicate a level of congestion experienced by the downlink packets. The headers also indicate a level of expected downstream congestion declared by an upstream node. In another step, the downlink packets are forwarded to the downstream user device through a wireless connection. In a further step, packets that have feedback indicative of the level of congestion experienced by the downlink packets, and any congestion experienced within the localized congestion exposure receiver node, are sent upstream. One possible advantage is that localized congestion exposure may be achieved within the local loop in the cellular network whether or not congestion exposure is supported outside of the local loop, to allow congestion to be managed within the local loop.

In another aspect, a localized congestion exposure receiver node configured for localized congestion exposure within a local loop in a cellular network. The receiver node includes a first interface configured to receive downlink packets destined for a downstream user device. The downlink packets have headers that indicate a level of congestion experienced by the downlink packets. The headers also indicate a level of expected downstream congestion declared by an upstream node. The receiver node also has a second interface configured to send the downlink packets to the downstream user device through a wireless connection. The receiver node also includes a feedback inserter to insert feedback indicative of the level of congestion experienced by the downlink packets, and any congestion experienced within the localized congestion exposure receiver node, into packets that are sent upstream through the first interface. One possible advantage is that localized congestion exposure may be achieved within the local loop in the cellular network whether or not congestion exposure is supported outside of the local loop, to allow congestion to be managed within the local loop.

In a further aspect, a method for localized congestion exposure within a local loop in a cellular network performed by a localized congestion exposure sender node of the local loop includes several steps. In one step, downlink packets destined for a downstream user device are received. In another step, packets having feedback indicating a congestion level are received from a downstream node of the cellular network. In a further step, a declaration of an expected downstream congestion level is inserted into headers of the received downlink packets. In another step, the downlink packets having the declaration of the expected downstream congestion level inserted into the headers thereof are forwarded toward the downstream user device. One possible advantage is that localized congestion exposure may be achieved within the local loop in the cellular network whether or not congestion exposure is supported outside of the local loop, to allow congestion to be managed within the local loop.

In yet another aspect, a localized congestion exposure sender node configured for localized congestion exposure within a local loop in a cellular network. The localized congestion exposure sender node is to be deployed in the local loop between a base station and Internet. The sender node has a first interface configured to receive downlink packets destined for a downstream user device. The sender node also has a second interface configured to receive packets having feedback indicating a congestion level from a downstream node of the cellular network. A congestion exposure inserter of the sender node is configured to insert a declaration of an expected downstream congestion level into headers of the received downlink packets. The sender node is configured to forward the downlink packets having the declaration of the expected downstream congestion level inserted into the headers thereof toward the downstream user device. One possible advantage is that localized congestion exposure may be achieved within the local loop in the cellular network whether or not congestion exposure is supported outside of the local loop, to allow congestion to be managed within the local loop.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
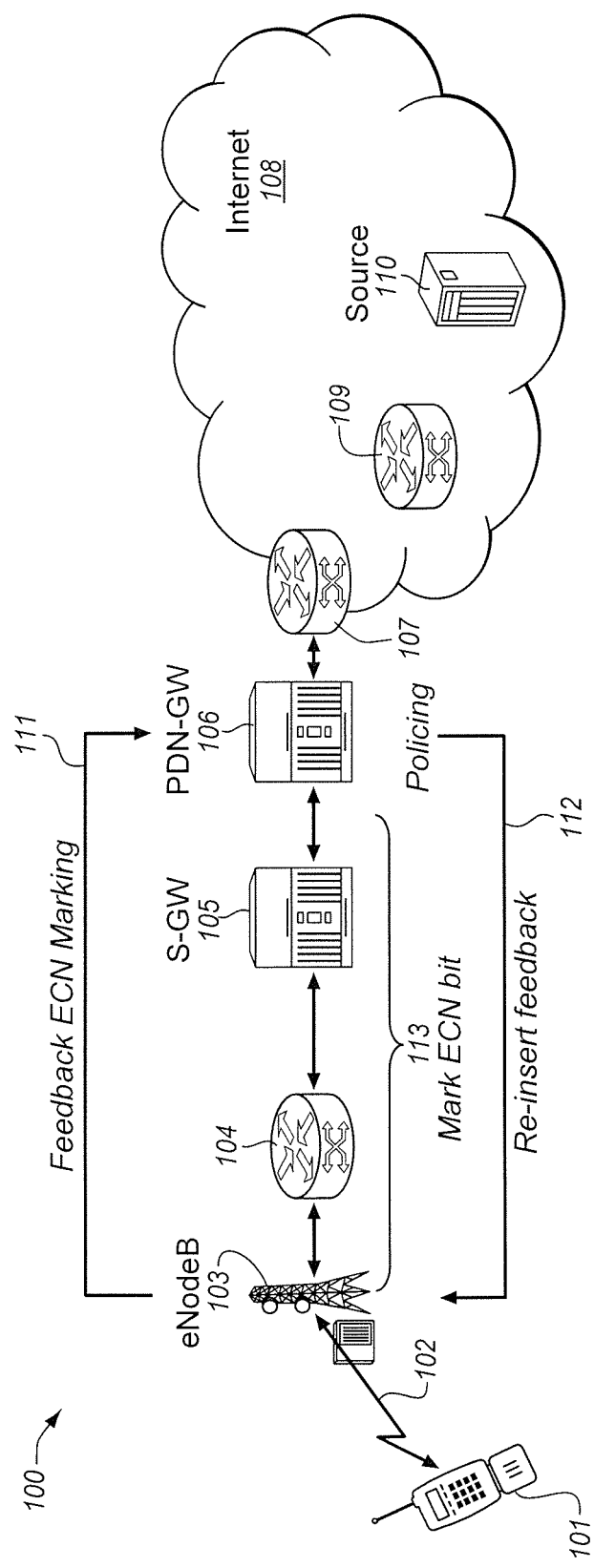
FIG. 1 illustrates an example embodiment of localized congestion exposure in a 3rd Generation Partnership Project (3GPP) Long Term Evolution (LTE) cellular network.

The following description describes methods and apparatus for localized congestion exposure. In the following description, numerous specific details are set forth, such as particular network configurations, particular types of congestion information, particular fields within headers, and the like. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Currently, the use of ECN, re-ECN, and congestion exposure is very limited. A significant contributing factor is that these congestion avoidance schemes tend to be very challenging to employ end-to-end from a receiver end terminal to a sender end terminal across a public network such as the Internet. One reason it is difficult to achieve full end-to-end deployment is that it typically involves modifying the receiver and sender end terminals, such as cell phones, smart phones, laptops, servers, routers, switches, etc., so that they support these congestion avoidance schemes. For example, the sender needs to be able to insert the feedback back into the network in congestion exposure. This typically involves support by, for example, the transmission control protocol (TCP)/Internet Protocol (IP) stacks in the operating system of interest (e.g., Linux, Windows, etc. for servers and Android, Windows mobile, etc. for cell phones). However, there are a large number of different manufacturers/vendors of such end terminals, and it is challenging to convince all of these manufacturers/vendors to agree to have the end terminals support these congestion avoidance schemes.

Another reason that it is difficult to achieve full end-to-end deployment is that the manufacturers of the routers in the Internet tend to be reluctant to modify their routers to support ECN and congestion exposure. In order to support ECN and congestion exposure, routers along the path, especially on the bottleneck links, should mark the ECN field to indicate congestion, but if they do not then ECN may not work as well. Moreover, it is common to have middleboxes, such as firewalls or intrusion detection systems (IDS), set up along the path. The congestion exposure framework should be such that these middleboxes do not clear ECN marks or the congestion exposure information. This is hard to guarantee, since the middleboxes may belong to different network management entities. For the above reasons it is reasonable to assume that deployment of congestion exposure that works end-to-end will be challenging and will take a significant amount of time.

Methods and apparatus for localized congestion exposure are disclosed herein. The term localized congestion exposure is intended to encompass localized re-ECN. For example, an embodiment of localized re-ECN is also an embodiment of localized congestion exposure. In the localized congestion exposure, the congestion exposure information is localized rather than only end-to-end. An advantage of the localized congestion exposure is the local property. The localized congestion exposure is useful for instance when it is not possible or practical to enable congestion exposure end-to-end and can, for instance, be deployed along a specific path. Previous proposals on congestion exposure are all purely end-to-end base, which as discussed above involves modification to the end hosts to support congestion exposure. This may create a deployment burden to the adoption of congestion exposure protocol. The new localized congestion exposure removes such restrictions. Localized congestion exposure can achieve fair resource control without any modification to the end hosts. Since the number of infrastructure nodes in localized congestion exposure is typically much smaller than the number of end hosts, and the infrastructure nodes may be under the control of the same network administration entity, the deployment overhead may be significantly reduced. In addition, end-to-end congestion exposure may be ineffective because ECN capability may be reset or IPv6 extension headers may be removed by middleboxes along the path, but this problem may be avoided or at least more manageable in localized congestion exposure. In addition the local congestion exposure approach disclosed herein is incrementally deployable, and may serve as a natural stepping stone towards end-to-end congestion exposure once it becomes widely deployed.

FIG. 1 illustrates an example embodiment of localized congestion exposure in a 3rd Generation Partnership Project (3GPP) Long Term Evolution (LTE) cellular network 100. The localized congestion exposure is practical and useful in LTE networks. In this example embodiment, neither ECN nor congestion exposure are supported at the end host. This is likely to be the dominant case initially.

The illustration depicts an example LTE architecture cellular network 100 and data plane path for data traffic in the 3GPP LTE cellular network. The eNodeB 103 is the name given to the LTE network base station. It is to be appreciated that there may be other base stations (not shown) in the network. The eNodeB is used for realizing the actual wireless connections 102 between user devices or equipment 101 and the network. The user data payload (the Internet Protocol (IP) packets) from/to the user equipment is handled by two logical nodes called the Serving Gateway (Serving-GW or S-GW) 105 and the Packet Data Network Gateway (PDN-GW) 106. The Serving-GW terminates an S1-U user plane interface towards the eNodeB. The Serving-GW also buffers downlink IP packets destined for user equipment 101 that happen to be in idle mode. The PDN-GW serves as a gateway towards Internet 108. The PDN-GW is the point of interconnect to external IP networks (e.g., the Internet) through an SGi interface. The PDN-GW also includes functionality for IP address allocation, charging, packet filtering, and policy-based control of flows. The S-GW and PDN-GW are logically separated entities according to LTE, although it is to be appreciated that they may be physically deployed on either one or more physical systems. The S-GW and the PDN-GW are subcomponents of System Architecture Evolution (SAE) which represents the core network architecture of LTE. The main component or core of SAE is known as the SAE core or Evolved Packet Core (EPC). The illustrated LTE architecture also includes a first router 104 between the eNodeB and the S-GW and a second router 107 connecting the PDN-GW to the Internet. It is to be appreciated that the network may include more or less routers (e.g., more routers between the base station and the S-GW, one or more routers between the S-GW and the PDN-GW, more routers between the PDN-GW and internet, etc. The eNodeB, the first router 104, the S-GW, the PDN-GW are commonly owned and operated by the same network operator entity. The Internet includes routers, only a third router 109 of which is illustrated for simplicity. A source or server 110 is coupled to the cellular network across the Internet.

Taking this example LTE infrastructure as shown in FIG. 1, congestion may occur at multiple places, such as eNodeB (most likely), S-GW, PDN-GW, and routers and switches along the path. Recently there has been a significant increase in data traffic in cellular networks due in part to video download, etc. In a download scenario, the user device (e.g., a cell phone) 101 downloads content (e.g. a streamed movie) from a server or source 110. In the illustration, a download scenario is exemplified, since the traffic volume on the downloading direction typically is much larger than that on the upstream direction. As a result, the download scenarios are more likely to cause congestion due to the larger traffic volume, in which case the localized congestion exposure has more benefit. As will be described further below, a similar setup can be done for upload scenarios, although the benefits of localized congestion exposure may not be as apparent, unless or until the traffic volume on the upload direction increases to a point that causes congestion (e.g., if the user equipment uses videotelephony, sends video, or otherwise sends large amounts of data).

The localized congestion exposure framework is implemented in the LTE infrastructure nodes, for example eNodeB, S-GW, and PDN-GW. In the illustration, the path between the eNodeB (base station) node and the PDN-GW node is exemplified, although the scope of the invention is not limited to this particular path. In this case localized congestion exposure is deployed along the path between the PDN-GW and the eNodeB. This means that the congestion exposure loop only runs locally between the PDN-GW and the eNodeB nodes. Neither ECN nor congestion exposure needs to be supported outside of this loop. However, embodiments of the invention will work in cases when ECN and congestion exposure are deployed in the end-to-end path.

In the illustrated embodiment, the base station or eNodeB serves as the congestion exposure receiver node and the PDN-GW serves as the congestion exposure sender node. Nodes along the path between the PDN-GW and the eNodeB (e.g., as shown the S-GW, the eNodeB, and the first router 104 between the S-GW and the eNodeB) may mark the ECN bit of packets to indicate congestion is experienced ("Mark ECN bit 113"). The base station or eNodeB may provide feedback regarding the ECN markings in the packets to indicate of the level of congestion experienced by the packets ("Feedback ECN Marking 111"). The PDN-GW may receive the feedback and re-insert feedback or congestion information back into the network as congestion exposure or re-ECN information ("Re-insert feedback 112"). Congestion exposure encodes congestion notification into data headers. Packets sent from the PDN-GW may carry a truthful prediction about the congestion condition of the remainder of their path. The re-feedback may include both an indication of the proportion of packets marked this window as nodes perform ECN marking, and an indication of the proportion of packets marked the previous window. Advantageously, localized congestion exposure may be achieved within the local loop in the cellular network whether or not congestion exposure is supported outside of the local loop. One potential advantage is that one or more nodes of the cellular network may use the localized congestion exposure information, for example, to one or more of allocate or control resources, drop packets, find malicious flows, find misbehaving users, stop malicious traffic from consuming more network resources, and/or otherwise hold flows, users, customers and data sources, accountable for the congestion they cause downstream.

In the LTE cellular network, packets between the PDN-GW node and the eNodeB node (the LTE network base station) are tunneled over General Packet Radio Service (GPRS) Tunneling Protocol (GTP). GTP is the delivery protocol to deliver data for a payload protocol. GTP is a tunneling protocol over user datagram protocol (UDP)/Internet Protocol (IP). GTP may be used with either UDP or TCP. UDP and TCP are at the transport layer or level. The transport layer or level is at a higher network layer or level than IP. IP is at the Internet layer or level. In addition, GTP is logically higher than UDP. A GTP path is identified in each node with an IP address and a UDP port number. The GTP protocol includes both for the data traffic (GTP-U) and the control traffic (GTP-C). That is, user plane traffic or path between PDN-GW and eNodeB is tunneled over GTP-U (U for user plane) tunnels, and a separate GTP-C protocol exists for the control signaling. This is very different from the end-to-end path on the Internet where the packet forwarding is performed at the IP level.

In the illustrated embodiment of the invention, congestion exposure is deployed along the GTP-U path between PDN-GW and eNodeB. That is, the GTP-U path supports congestion exposure. Implementing the localized congestion exposure at the higher level of GTP facilitates implementation. These tunneling protocols give the operator a large degree of flexibility to control the congestion mechanism incorporated with the GTP protocols. Existing GTP tunnel is a UDP based tunneling protocol without any congestion avoidance mechanisms. Support for ECN over this path is currently unspecified but is relatively straightforward. Reference may be made to ECN for generic IP over IP tunneling.

Figure 2:
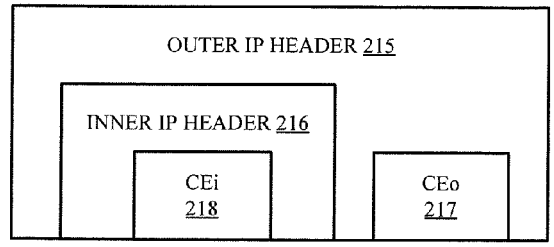
FIG. 2 is an example embodiment of outer and inner IP headers.

FIG. 2 is an example embodiment of an outer IP header 215 and an inner IP header 216. The outer IP header has outer congestion encountered or experienced markings (CEo) 217. The inner IP header has inner congestion encountered or experienced markings (CEi) 218. Implementing support for ECN in the GTP-U tunnels may include the outer IP header being indicated as ECN capable. Such ECN marking support on GTP tunneling is believed to be new. In one aspect, ECN-CE markings in the outer IP header may not be copied to the inner IP header at tunnel egress if the inner header is not ECN capable. In one aspect, the GTP-U protocol may use the optional sequence number to make the feedback reports reliable.

Figure 3:
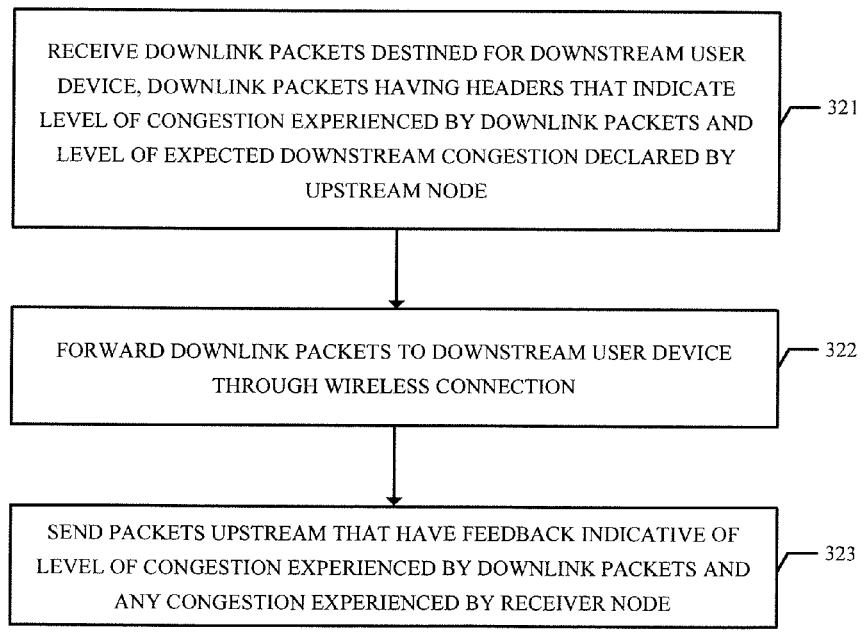
FIG. 3 is a block flow diagram of an example embodiment of a method for localized congestion exposure within a local loop in a cellular network performed by a localized congestion exposure receiver node (e.g., an eNodeB or other base station) of the local loop.

FIG. 3 is a block flow diagram of an example embodiment of a method 320 for localized congestion exposure within a local loop in a cellular network performed by a localized congestion exposure receiver node of the local loop. In one embodiment, the localized congestion exposure receiver node may be an eNodeB or other base station.

The method includes receiving downlink packets destined for a downstream user device, at block 321. The downlink packets have headers that indicate a level of congestion experienced by the downlink packets (e.g., ECN-CE markings or other indications that congestion was encountered or experienced). The headers also indicate a level of expected downstream congestion declared by an upstream node (e.g., re-ECN information or other congestion exposure information).

In one embodiment, the downlink packets as received may have outer headers that indicate ECN capable transport and inner headers that indicate not ECN capable transport. In one embodiment, the downlink packets may be received through a tunnel, which is not an IP over IP tunnel, and an outer header of the downlink packets as received may indicate ECN capable transport. In one aspect, the tunnel may be a General Packet Radio Service (GPRS) Tunneling Protocol (GTP) tunnel, and the level of the expected downstream congestion declared by the upstream node may be indicated in GTP headers of the downlink packets received through the GTP tunnel.

The method includes forwarding the downlink packets to the downstream user device through a wireless connection, at block 322. In one embodiment, for example when the downstream user device does not support congestion exposure, the downlink packets forwarded may not indicate the level of expected downstream congestion declared by the upstream node.

The method also includes sending packets upstream that have feedback indicative of the level of congestion experienced by the downlink packets and any congestion experienced within the localized congestion exposure receiver node, at block 323. In this case, the eNodeB, base station, or other node serves as the receiver node in the normal congestion exposure/ECN deployment.

The eNodeB may collect the ECN-CE marks and provide feedback to the PDN-GW. Moreover, the schedulers in eNodeB are likely points where congestion may be encountered. Other points may be a queue on the Radio Link Control (RLC) layer with active queue management (AQM) algorithm. As ECN is not enabled for the inner IP header, packets may be dropped as a congestion indication. This congestion information may also be fed back to the PDN-GW. In one aspect, this congestion information may be combined (e.g., logically ORed) with the ECN-CE marks on outer IP header (CEi∥CEo in FIG. 2). A possible report interval may be once every round trip time (RTT) or perhaps more seldom. In one embodiment, the feedback may be provided in-line, for example through ECN code-point bits spread across multiple or many packets.

Figure 4:
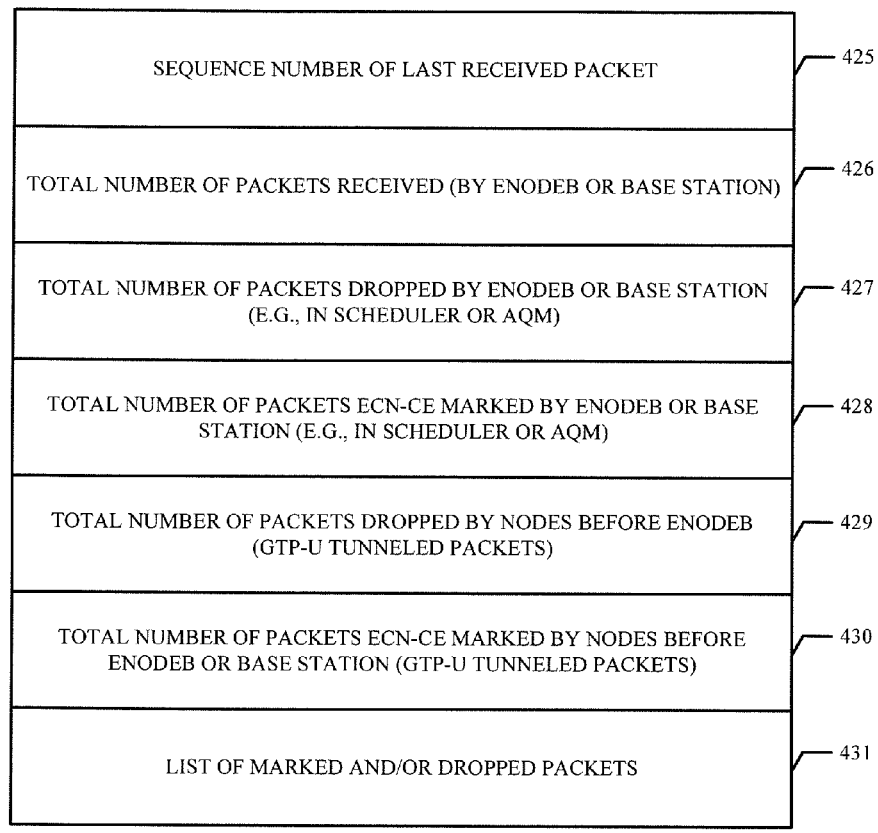
FIG. 4 is a block diagram illustrating an example embodiment of a report format for feedback.

The feedback may include various different types of information. FIG. 4 is a block diagram illustrating an example embodiment of a report format 424 for feedback. The report format may contain one or more of the following types of information:

(a) sequence number of last received packet 425;

(b) total number of packets received (by eNodeB or base station) 426;

(c) total number of packets dropped by eNodeB or base station (e.g., in scheduler or AQM) 427;

(d) total number of packets ECN-CE marked by eNodeB or base station (e.g., in scheduler or AQM) 428;

(e) total number of packets dropped by nodes before eNodeB (GTP-U tunneled packets) 429;

(f) total number of packets ECN-CE marked by nodes before eNodeB or base station (GTP-U tunneled packets) 430;

(g) list of marked and/or dropped packets 431, which may be useful for computation of congestion volume (sum of sizes of marked or dropped packets). Congestion volume may represent the volume of the packets that are marked, and may be computed as the accumulated packet size of all marked packets, this can be put in relation to the total traffic volume, the congestion volume is then expressed as a percentage. Congestion volume can be computed per flow, per user, per aggregate of flows, etc. Moreover the congestion volume can be computed per time or as an accumulated metric.

Accordingly, the eNodeB or base station may provide the feedback and serve as the receiver node in the congestion exposure/ECN deployment. Advantageously, various of the types of information listed above, which may be readily known by the eNodeB or base station, may not be known or readily known by a cell phone or other user equipment. Some of the information is privy to, internal to, or only known by the base station. For example, the base station may typically know or be able to figure out the types of information listed for (b), (c), (d), (e), or (f), but the cell phone or other user equipment may not be able to know or figure out these types of information. For example, considering the types of information listed for (c) and (e), the base station may know or be able to figure out the total number of packets it dropped and the total number of packets dropped by nodes before the base station (e.g., by analyzing packet sequence numbers to see which ones are missing). However, the cell phone or other user equipment may only be able to know or figure out the total number of packets dropped prior to the cell phone, but may not be able to differentiate which of these packets were dropped prior to the base station versus which of these packets were dropped by the base station.

The illustrated report format is only one example embodiment. As previously mentioned, the report format may contain one or more of these types of information (i.e., not all of this information is required). Moreover, alternate embodiments of report formats may include other types of information besides just those listed above. Naturally, the order/arrangement of the various types of information is not required and may optionally be rearranged.

Figure 5:
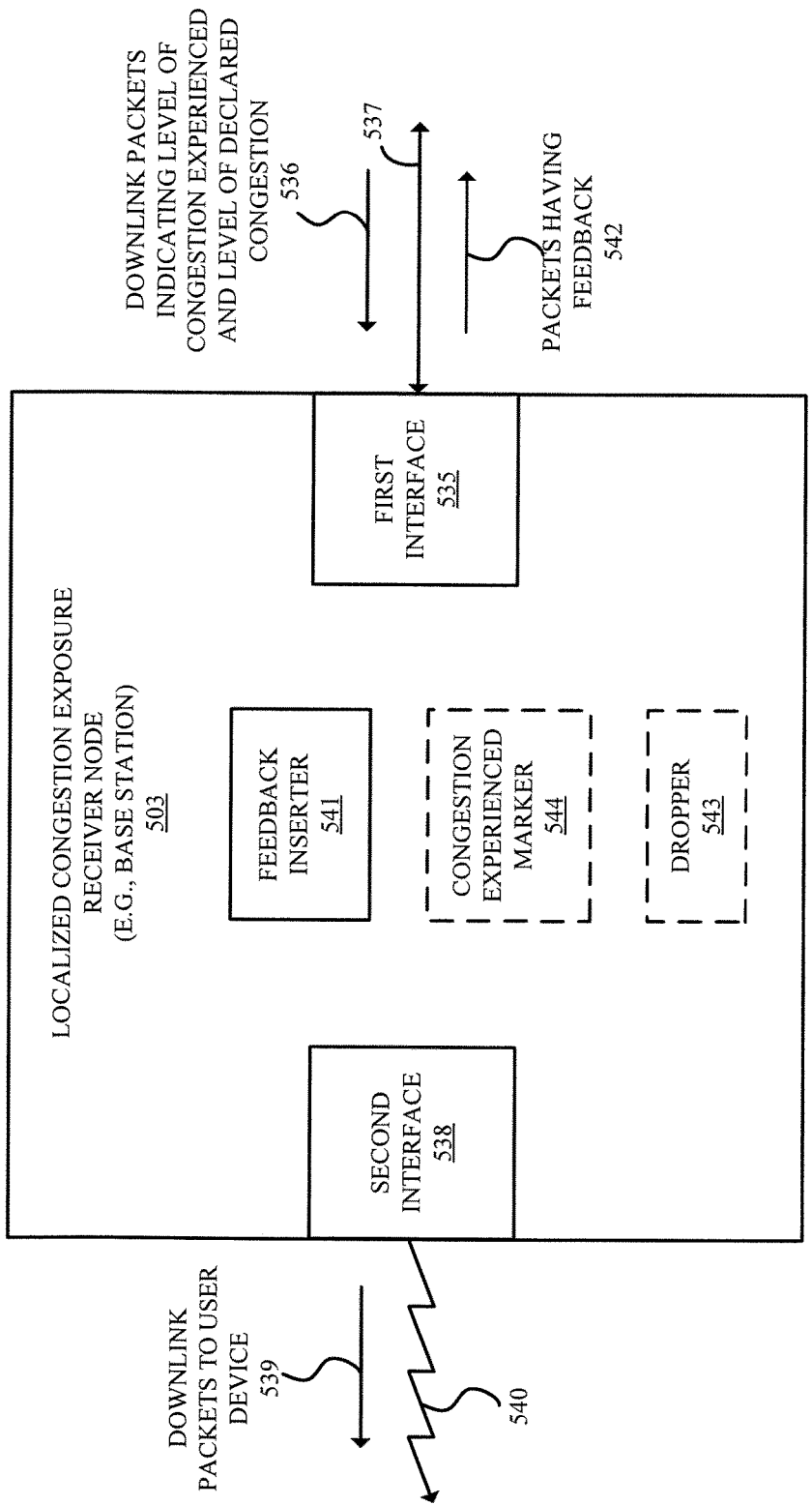
FIG. 5 is a block diagram of an example embodiment of a localized congestion exposure receiver node (e.g., an eNodeB or other base station) configured for localized congestion exposure within a local loop in a cellular network.

FIG. 5 is a block diagram of an example embodiment of a localized congestion exposure receiver node 503 configured for localized congestion exposure within a local loop in a cellular network. In one embodiment, the localized congestion exposure receiver node may be an eNodeB or other base station.

The localized congestion exposure receiver node has a first interface 535 configured to receive downlink packets 536 destined for a downstream user device over a connection 537. The downlink packets having headers that indicate a level of congestion experienced by the downlink packets (e.g., ECN-CE markings or other indications that congestion was encountered or experienced). The headers also indicate a level of expected downstream congestion declared by an upstream node (e.g., re-ECN information or other congestion exposure information).

In one embodiment, the downlink packets as received may have outer headers that indicate ECN capable transport and inner headers that indicate not ECN capable transport. In one embodiment, the downlink packets may be received through a tunnel, which is not an IP over IP tunnel, and an outer header of the downlink packets as received may indicate ECN capable transport. In one aspect, the tunnel may be a General Packet Radio Service (GPRS) Tunneling Protocol (GTP) tunnel, and the level of the expected downstream congestion declared by the upstream node may be indicated in GTP and/or outer IP headers of the downlink packets received through the GTP tunnel. In one aspect, the level of expected downstream congestion may be conveyed in IP header extensions. In another aspect, the level of expected downstream congestion may be conveyed using bits from a flow label field in an IPv6 header.

The localized congestion exposure receiver node has a second interface 538 configured to send the downlink packets 539 to the downstream user device through a wireless connection 540. In one embodiment, for example when the downstream user device does not support congestion exposure, the forwarded downlink packets may not indicate the level of expected downstream congestion declared by the upstream node.

The localized congestion exposure receiver node has a feedback inserter 541 to insert feedback indicating the level of congestion experienced by the downlink packets into packets 542 that are sent upstream through the first interface. The feedback inserter may insert feedback including any one or more of the types of information shown in FIG. 4. The feedback inserter may be implemented in software, firmware, hardware (e.g., circuitry) or a combination.

In one embodiment, the localized congestion exposure loop may include a dropper 543 (e.g., an edge egress dropper) or other guard at the egress to prevent or discourage understatement of expected downstream congestion. In one aspect, the dropper or guard may be introduced at the last network egress, although this is not required.

The localized congestion exposure, as in the re-ECN framework, may define positive or negative flows, meaning flows where the moving average of the downstream congestion metric is persistently positive or negative. A negative flow is one having more congestion experienced or encountered (CE) marked packets than the sender declared or claims to cause. In positive flows the claimed or declared congestion is more than the actual level. The notion of a negative flow or metric may arise because it is derived by subtracting the real congestion level from the claimed or declared congestion level.

The guard or dropper 543 may drop packets in flows that become negative downstream congestion, i.e. the congestion caused in reality is higher than that claimed or declared. As traffic leaves the last network node before the receiver, the fraction of positive octets in a flow should match the fraction of negative octets introduced by congestion marking, leaving a balance of zero. When positive, the dropper may take no action, meaning that the source is slower than it has to. The router or dropper may drop packets in negative flows, for example, to ensure fairness. Advantageously, this may help to ensure both that congestion is declared honestly and that the sender's rate responds appropriately. Moreover, the dropper may optionally be omitted, for example if the path between the PDN-GW and the eNodeB is trusted.

The localized congestion exposure approach introduces the necessary incentives (e.g., whip and carrot mechanisms) for sources to behave in such a way that excessive congestion can be avoided. This may result in a more stable Internet experience for all users. In one aspect, the localized congestion exposure approach may be net-neutral such that it does not make judgments based on type of traffic (e.g., video on demand (VoD), peer-to-peer (p2p), etc.), but instead the localized congestion exposure approach does only care for the amount of congestion that is caused, although the scope of the invention is not limited in this respect.

Referring again to FIG. 5, in one embodiment, the base station or eNodeB may have an ECN marker or other congestion experienced/encountered marker 544. The ECN marker may mark the ECN field of packets (e.g., mark ECN-CE). Alternatively, in another embodiment, the base station or eNodeB may not necessarily have an ECN marker. For example, the base station or eNodeB may know which packets it would ECN mark, and can incorporate such packets into the feedback, without ECN marking them.

In one embodiment, the example embodiment of the localized congestion exposure receiver node of FIG. 5 may perform the example embodiment of the operations and method of FIG. 3. However, it should be understood that the operations and method of FIG. 3 can be performed by alternate embodiments of the invention other than those discussed with reference to FIG. 5. Further, the localized congestion exposure receiver node of FIG. 5 can perform other operations and methods different than those of FIG. 3.

Figure 6:
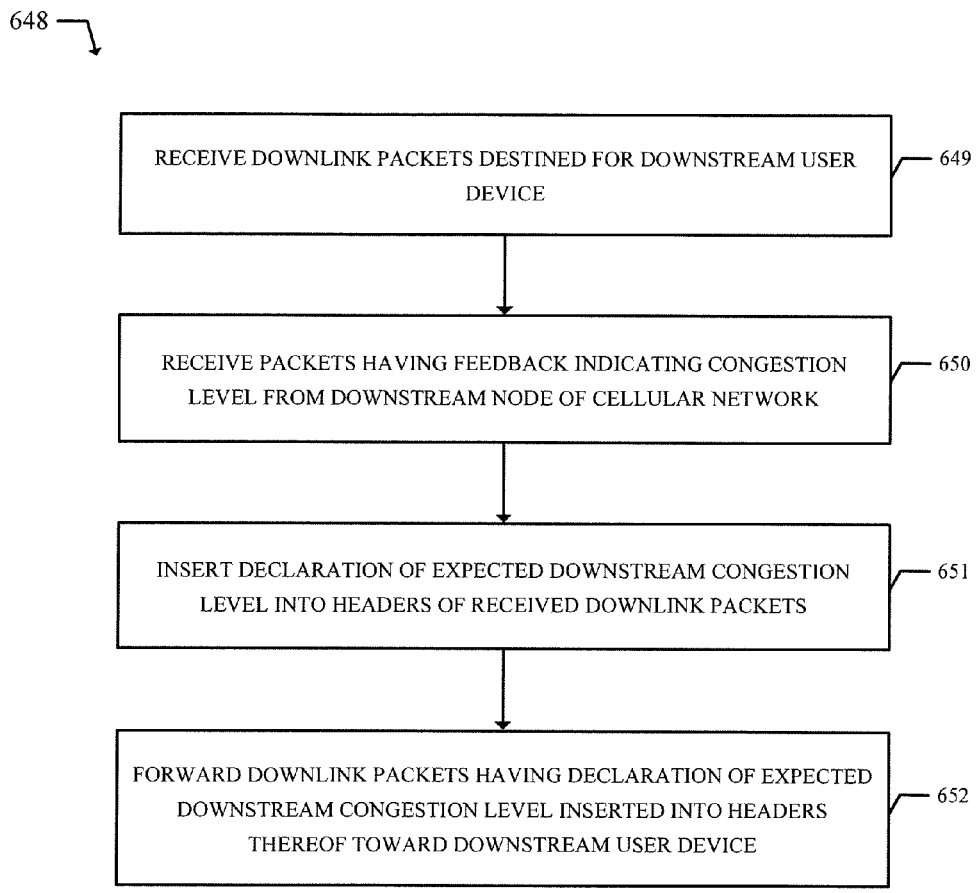
FIG. 6 is a block flow diagram of an example embodiment of a method for localized congestion exposure within a local loop in a cellular network performed by a localized congestion exposure sender node (e.g., a gateway) of the local loop.

FIG. 6 is a block flow diagram of an example embodiment of a method 648 for localized congestion exposure within a local loop in a cellular network performed by a localized congestion exposure sender node of the local loop. In one embodiment, the localized congestion exposure sender node may be a cellular network gateway (e.g., a PDN-GW or an S-GW). Alternatively, the localized congestion exposure sender node may be a router.

The method includes receiving downlink packets destined for a downstream user device, at block 649. In one embodiment, for example when an end terminal does not support congestion exposure, the downlink packets as received may not have a declaration of expected downstream congestion (e.g., there may be no re-ECN information or other congestion exposure information). In one embodiment, the downlink packets as received may have headers that indicate not ECN capable transport.

The method includes receiving packets having feedback indicating a congestion level from a downstream node of the cellular network, at block 650. In one embodiment, the feedback may include any one or more of the types of information shown in FIG. 4. Possible examples of such information may include one or more of total number of packets dropped by the base station, total number of packets dropped by nodes before the base station, total number of packets ECN-CE marked by the base station, total number of packets ECN-CE marked by nodes before the base station, etc.

The method includes inserting a declaration of an expected downstream congestion level into headers of the received downlink packets, at block 651. In one embodiment, the declaration or claim of the expected downstream congestion information may include re-ECN information or other congestion exposure information. It is to be appreciated that the scope of the invention is not limited to the declared or claimed expected downstream congestion level accurately corresponding to the actual level (e.g., the declared or claimed congestion level may be false without limitation to the scope of the invention).

The method includes forwarding the downlink packets having the declaration of the expected downstream congestion level inserted into the headers thereof toward the downstream user device, at block 652. In one embodiment, the downlink packets may be forwarded through a tunnel, which is not an IP over IP tunnel, and an outer header of the downlink packets as forwarded may indicate ECN capable transport. In one aspect, the tunnel may be a GTP tunnel, and the declaration of the expected downstream congestion level may be indicated in GTP headers of the downlink packets. In one embodiment, the PDN-GW can re-insert the congestion information into the GTP-U headers.

Figure 7:
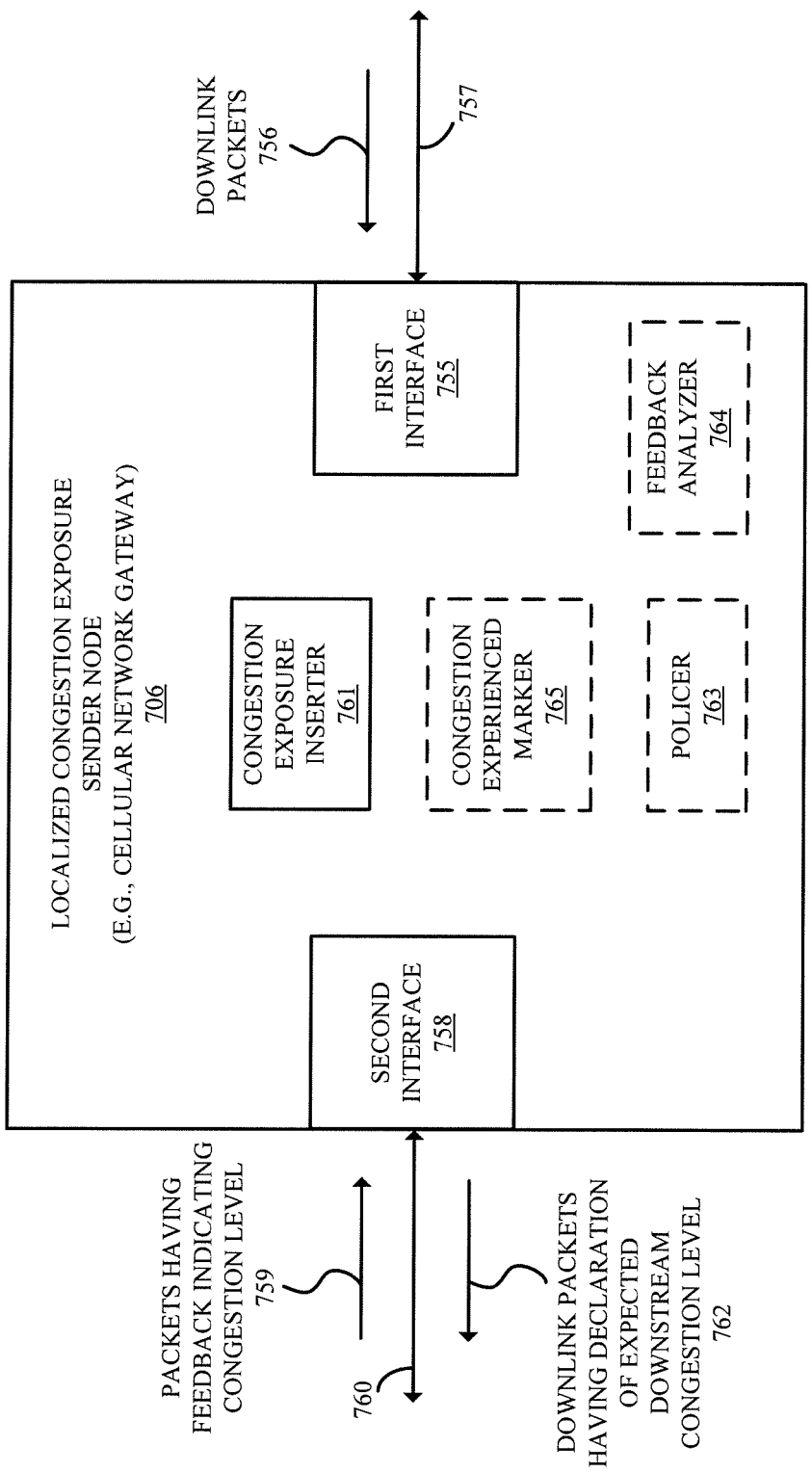
FIG. 7 is a block diagram of an example embodiment of a localized congestion exposure sender node (e.g., a gateway) configured for localized congestion exposure within a local loop in a cellular network.

FIG. 7 is a block diagram of an example embodiment of a localized congestion exposure sender node 706 configured for localized congestion exposure within a local loop in a cellular network. The localized congestion exposure sender node is to be deployed in the local loop between a base station and Internet. In one embodiment, the localized congestion exposure sender node may be a cellular network gateway (e.g., a PDN-GW or an S-GW). Alternatively, the localized congestion exposure sender node may be a router.

The localized congestion exposure sender node has a first interface 755 configured to receive downlink packets 756 destined for a downstream user device over a first connection 757. In one embodiment, for example when an end terminal does not support congestion exposure, the interface may receive downlink packets that do not have a declaration of expected downstream congestion (e.g., there may be no re-ECN information or other congestion exposure information). In one embodiment, the interface may receive downlink packets that have headers that indicate not ECN capable transport.

The localized congestion exposure sender node has a second interface 758 configured to receive packets 759 having feedback indicating a congestion level from a downstream node of the cellular network over a second connection 760. In one embodiment, the second interface may receive feedback that may include any one or more of the types of information shown in FIG. 4.

The localized congestion exposure sender node has a congestion exposure inserter 761 configured to insert a declaration of an expected downstream congestion level into headers of the received downlink packets 762. In one embodiment, the congestion exposure inserter may insert a declaration or claim of the expected downstream congestion information that includes re-ECN information or other congestion exposure information. The congestion exposure inserter may be implemented in software, firmware, hardware (e.g., circuitry), or a combination thereof. The sender node is configured to forward the downlink packets having the declaration of the expected downstream congestion level inserted into the headers thereof toward the downstream user device.

To ensure honest marking, a few entities may be included in the network to help to ensure the correct behavior. One entity is source congestion control. The sender may throttle its rate as downstream congestion increases, with some version of TCP-friendly congestion response. As previously discussed, the cellular network may have an edge egress dropper. Moreover, in one embodiment, the cellular network may have an ingress policer. Re-ECN and congestion exposure protocols ensure that packets carry information about their own expected downstream congestion. In one embodiment, a PDN-GW or access router can deploy a policer at its ingress to check that a source is complying with whatever congestion control it should be using. The policer may drop packets or stop flows for aggressive flows/users at the ingress to help avoid wasting downstream resources. As shown, in one embodiment, the PDN-GW may optionally have a policer 763. Alternatively, another component (e.g., an access router or first hop router connecting the PDN-GW to the Internet) may have such a policer.

This policing (e.g., by the PDN-GW) can be performed based on either per flow or a per customer basis. By way of example, to ensure that a flow, a user, or a set of customers doesn't generate more congestion in the network than its due share, a modified bulk token-bucket can be maintained to allocate the resources gradually over time. Tokens may represent the amount of congestion each user allows to consume in the network. The modified bulk token-bucket may have parameters such as the initial token level, the filling rate, and the bucket depth. All traffic from a user over the lifetime of their subscription may be policed in the same token bucket. Such a modified bulk token bucket is not required. Alternatively, other approaches for representing the amount of congestion each user is allowed to consume in the network and/or allocating network resources may be used instead, such as, for example, various types of moving averages or approaches known for re-ECN or congestion exposure.

The PDN-GW or policer can apply policing on flows depending on the operator preference. For instance the PDN-GW or policer may drop packets at the ingress for sources that cause more than 1% ECN rate or congestion volume, for example. The ECN rate may represent the number of ECN-CE marked packets divided by the total number packets. This value is typically computed over a sliding window, for example over the last 100 packets. As another example, a more friendly action is to provide content providers with feedback on how much their services congest the networks.

Referring again to FIG. 7, the PDN-GW also includes an optional feedback analyzer 764 to analyze the feedback. The feedback analyzer may be implemented in hardware, software, firmware, or a combination thereof. The PDN-GW gets the feedback or congestion information (e.g., the types of information shown in FIG. 4) from the base stations or eNodeBs. The PDN-GW or the feedback analyzer can, based on this information detect or find one or more of the following:

(a) find malicious flows;
(b) find misbehaving users;
(c) find aggressive sources of traffic; and/or
(d) more easily find overloaded spots in the network.

The detection can be implemented by keeping the statistical value of ECN marked packets. As an example of the possible actions, the PDN-GW can see if several users are connected to one particular source (e.g. a popular video on demand (VoD) service) and that these flows all case a too high ECN-rate. It is then likely that the source need to improve its congestion control algorithms. Another interesting case is if one user gets data from many sources and shows a total high ECN-rate. It is then possible that the user is subject to a distributed denial-of-service (DDoS) attack. These two scenarios can both be detected by monitoring the ECN marking rate in the PDN-GW.

If we take a download use case, it may be tempting to implement ECN and some kind of policing only in eNodeB, which is one possible option for an embodiment of the invention. However, one potential drawback to doing so is that it is then difficult to know if a specific source is responsible for congestion (e.g., denial-of-service (DoS) or non-responsive congestion control algorithms in source). What is better is for the eNodeB to feedback the ECN marks to the PDN-GW, so the PDN-GW can perform better analysis to localize misbehaving sources based on bulk data, and then make better policing decisions. Further, enforcing the policing decisions at the ingress hop, for example the PDN-GW, is an efficient way to stop malicious traffic from consuming more network resources.

In one embodiment, the S-GW and PDN-GW (e.g., the outgoing queue) may be ECN capable. For example, they may each have an ECN marker that is able to set ECN-CE to indicate congestion encountered or experienced on the outer IP header. In one aspect, they may mark packets with probability depending on an average queue size. To encode the congestion level to the packet, we need ECN enabled routers which mark the packets whenever congestion occurs. The routers along the path may also be ECN capable. In one aspect, this can be implemented together with random early detection (RED) which is widely supported in commercial routers. As shown, the illustrated sender node 706 has an optional ECN marker or other congestion exposure inserter 765. Alternatively, as shown in FIG. 1, the PDN-GW may be outside the bracket and need not necessarily ECN mark packets, but rather this may be performed by other nodes (e.g., S-GW, routers, etc.).

In one embodiment, the example embodiment of the localized congestion exposure receiver node of FIG. 7 may perform the example embodiment of the operations and method of FIG. 6. However, it should be understood that the operations and method of FIG. 6 can be performed by alternate embodiments of the invention other than those discussed with reference to FIG. 7. Further, the localized congestion exposure receiver node of FIG. 7 can perform other operations and methods different than those of FIG. 6.

Figure 8:
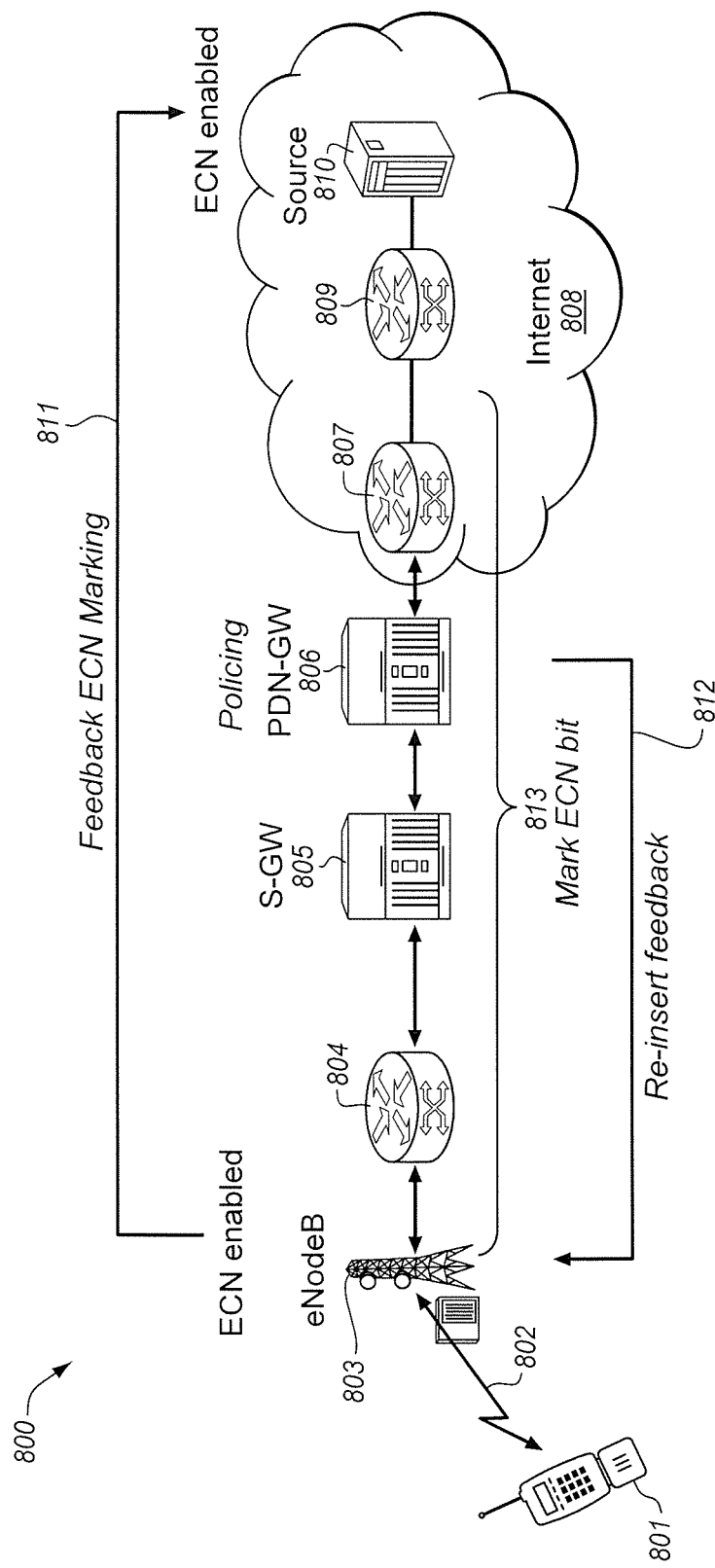
FIG. 8 illustrates a second example embodiment of localized congestion exposure in a 3GPP LTE cellular network, in which ECN is supported end-to-end.

FIG. 8 illustrates a second example embodiment of localized congestion exposure in a 3GPP LTE cellular network 800 in which ECN is supported end-to-end. ECN is enabled on both end points (e.g., user equipment 801 and a source 810). Routers of the Internet may also support ECN.

The illustrated LTE cellular network includes a user equipment 801, an eNodeB 803 having a wireless connection 802 to the user equipment, a first router 804, a S-GW 805, a PDN-GW 806. The LTE cellular network may be as previously described and may have any of the variations previously described. Also shown are Internet 808, a second router 807, a third router 809, and a source 810.

The eNodeB is ECN enabled. The source is also ECN enabled. The eNodeB provides feedback ("Feedback ECN Marking 811") to the ECN enabled source. The eNodeB, the first router, the S-GW, the PDN-GW, and routers of the Internet may perform ECN marking ("Mark ECN bit 813"). The PDN-GW may perform policing. The PDN-GW may provide congestion exposure information ("Re-insert feedback 812").

In one embodiment, localized congestion exposure in the LTE cellular network may have primarily an interest to protect the traffic that goes from PDN-GW to eNodeB (or UE). For this reason, in one aspect, only ECN-CE marking that occurs within this local network may be considered. Policing or a policer at the PDN-GW ingress (or other localized congestion exposure sender) may therefore subtract the incoming measured ECN rate (at the PDN-GW ingress) from the fed back ECN-rate from the eNodeB or base station (or other localized congestion exposure receiver). This will give a measure of how much a flow congests along the downstream path from PDN-GW.

Figure 9:
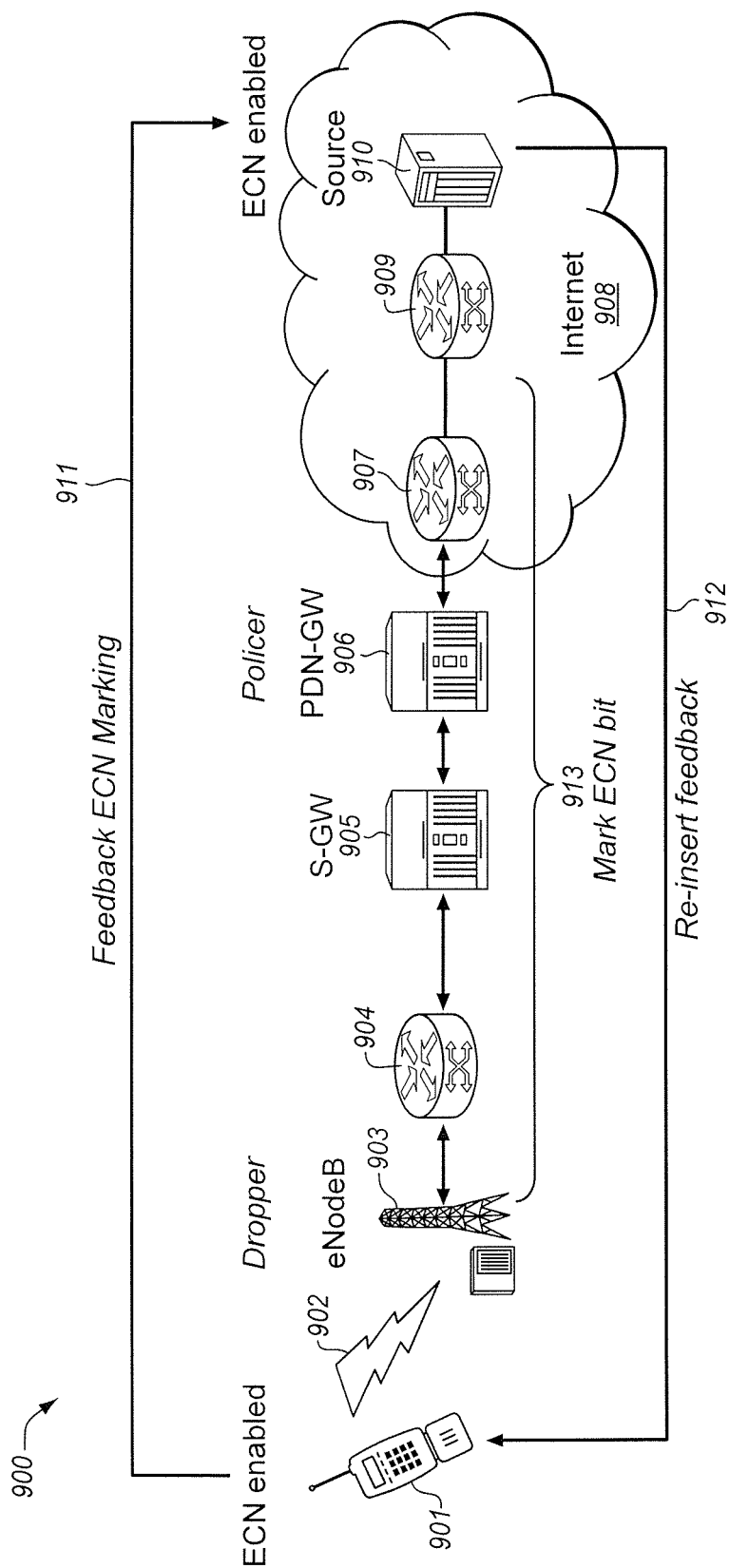
FIG. 9 illustrates a third example embodiment of localized congestion exposure in a 3GPP LTE cellular network, in which both ECN and congestion exposure are supported end-to-end.

FIG. 9 illustrates a third example embodiment of localized congestion exposure in a 3GPP LTE cellular network 900 in which both ECN and congestion exposure are supported end-to-end. ECN is enabled on both end points (e.g., user equipment 901 and a source 910). Congestion exposure is also enabled on both end points. Routers of the Internet may also support ECN and congestion exposure.

The illustrated LTE cellular network includes a user equipment 901, an eNodeB 903 having a wireless connection 902 to the user equipment, a first router 904, a S-GW 905, a PDN-GW 906. The LTE cellular network may be as previously described and may have any of the variations previously described. Also shown are Internet 908, a second router 907, a third router 909, and a source 910.

The ECN enabled user equipment or device provides feedback ("Feedback ECN Marking") to the ECN enabled source. The ECN enabled source may provide congestion exposure information ("Re-insert feedback") back into the network and it may go all the way to the ECN enabled user equipment or device. The eNodeB, the first router, the S-GW, the PDN-GW, and routers of the Internet may perform ECN marking ("Mark ECN bit").

The PDN-GW may have a policer. The eNodeB may have a dropper and may act as an edge egress dropper. The end-to-end path may be established between user equipment (UE) and data provider servers, where the IP connection is established on top of an overlay path on top of eNodeB, S-GW, etc. The policer can be deployed on the first hop of the path under mobile operator's control, i.e. the PDN-GW. The dropper is deployed at the egress of the path, in this example, the last hop in mobile backhaul, the eNodeB. It can also be deployed on the S-GW, depending on the resource contention concerns in the network, or on the last hop before eNodeB, for example.

Example embodiments of localized congestion exposure have been shown and described for 3GPP LTE cellular networks. As used herein, the term LTE is intended to encompass future versions and releases of LTE, for example LTE Advanced, 4G, etc. Moreover, embodiments of localized congestion exposure methods and apparatus as disclosed herein may be used in future non-LTE cellular, such as successors to 3G, LTE, and 4G cellular networks.

Advantageously, localized congestion exposure may be achieved within the local loop in the cellular network whether or not congestion exposure is supported outside of the local loop. Advantageously, one or more nodes of the cellular network may use the localized congestion exposure information to one or more of, allocate or control resources, drop packets, find malicious flows, find misbehaving users, stop malicious traffic from consuming more network resources, etc.

Download scenarios, in which packets are downloaded to user equipment from the Internet, have been exemplified, due to the large volume of traffic presently experienced in the download direction, for example due to video downloads to cell phones. However, a large volume of traffic may also be experienced in the upload direction, in which packets are uploaded from user equipment (e.g., cell phones) to the Internet in route to other user equipment or servers. For example, this may be the case for videotelephony, or when cell phones or other user equipment upload video or other large amounts of data.

Figure 10:
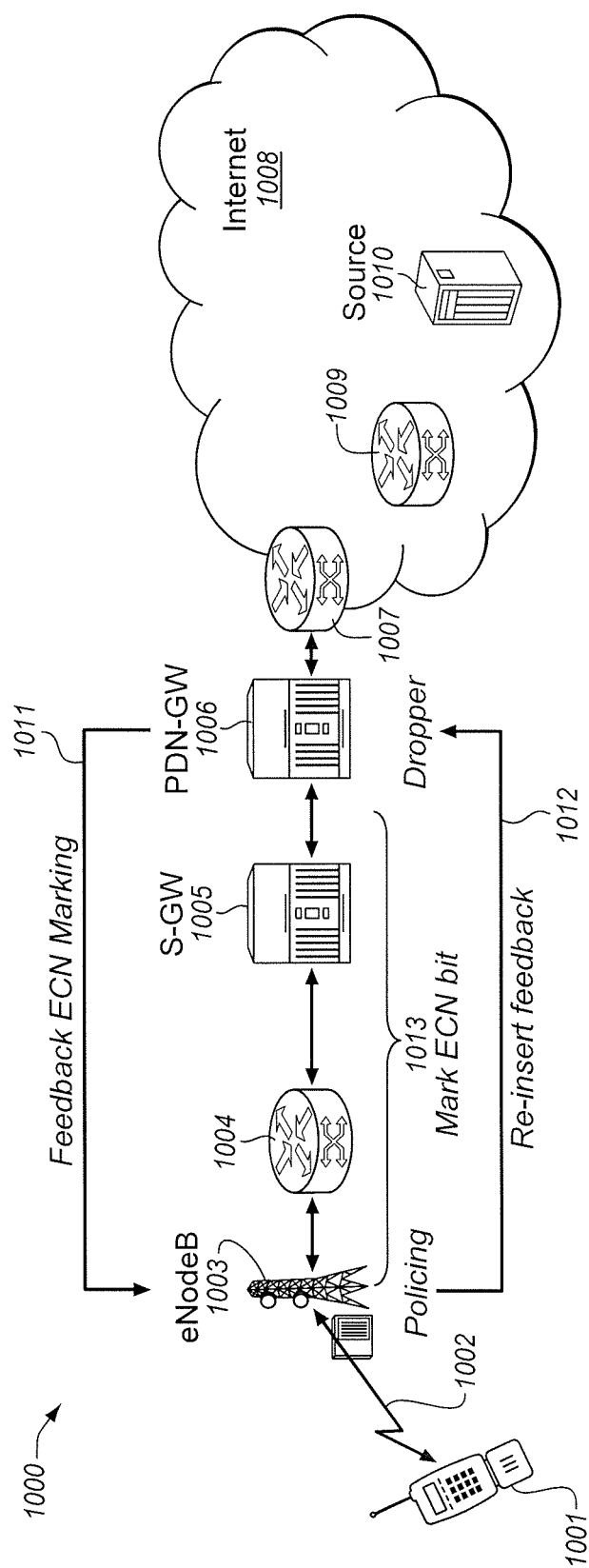
FIG. 10 illustrates an example embodiment of localized congestion exposure in a 3GPP LTE cellular network for an upload scenario in which packets are uploaded from user equipment to the Internet.

FIG. 10 illustrates an example embodiment of localized congestion exposure in a 3GPP LTE cellular network for an upload scenario in which packets are uploaded from user equipment to the Internet. Localized congestion exposure in a case where the end points do not support congestion exposure or ECN is used for purposes of illustration, although other embodiments apply to the scenarios of FIGS. 8-9.

The illustration shows a LTE cellular network 1000 including a user equipment 1001, an eNodeB 1003 having a wireless connection 1002 to the user equipment, a first router 1004, an S-GW 1005, a PDN-GW 1006. The LTE cellular network may be as previously described and may have any of the variations previously described. Also shown are Internet 1008, a second router 1007, a third router 1009, and a source 1010.

In this upload scenario, the PDN-GW is the congestion exposure receiver node and the eNodeB is the congestion exposure sender node. Alternatively, another node (e.g., the S-GW) may be the congestion exposure receiver node, and another node (e.g., the first router 1104) may be the congestion exposure sender node. Nodes along the path between the PDN-GW and the eNodeB (e.g., as shown the S-GW, the eNodeB, and the first router 1004 between the S-GW and the eNodeB) may ECN mark packets to indicate congestion is experienced ("Mark ECN bit 1013"). The PDN-GW may provide feedback regarding the ECN markings in the packets to indicate of the level of congestion experienced by the packets ("Feedback ECN Marking 1011"). The eNodeB or base station may receive the feedback and re-insert feedback or congestion information back into the network as congestion exposure or re-ECN information ("Re-insert feedback 1012"). The eNodeB or base station may optionally have a policer and perform policing. The policing may also or alternatively be performed at another node (e.g., the first router 1104 or the S-GW. The PDN-GW may have a dropper and may perform dropping packets based on congestion information. The dropper may also or alternatively be included at another node (e.g., the first router 1104 or the S-GW.

Additional alternate embodiments are contemplated. Having described embodiment(s) of the invention, alternative embodiment(s) will now be described. Like the previous embodiment(s), these alternative embodiment(s) are localized congestion avoidance schemes.

A first alternate embodiment pertains to localized explicit congestion notification (ECN) within a local loop in a cellular network or mobile backhaul or over a GTP tunnel, whether or not there is also localized congestion exposure. For example, an ECN sender may designate an outer header as ECN capable even when inner headers of packets received by the ECN sender are designated not ECN capable. If the inner headers are designated ECN capable, the ECN sender may optionally disregard or subtract the incoming ECN markings. The ECN sender may forward the packets through a GTP tunnel. One or more other downstream nodes may ECN mark the outer headers even when the inner headers are designated not ECN capable. An ECN receiver may return feedback regarding the ECN-CE marked packets.

A second alternate embodiment pertains to localized ECN or localized congestion exposure in a non-cellular or non-mobile backhaul network. In various embodiments, a Cable Modem Termination System (CMTS), Digital Subscriber Line Access Multiplexer (DSLAM), other Digital Subscriber Line (DSL) device, or Multi-service Edge Router (MSER) may incorporate features of an endpoint (sender or receiver) for localized ECN or localized congestion exposure as disclosed elsewhere herein.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

In the description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method of localized congestion exposure within a local loop in a cellular network performed by a localized congestion exposure sender node of the local loop, said method comprising:
  receiving, at the localized congestion exposure sender node of the local loop in the cellular network, downlink packets destined for a downstream user device, and having headers that indicate not explicit congestion notification capable transport, wherein the localized congestion exposure sender node is a cellular network gateway between a downstream node of the local loop and the Internet, and wherein the downstream node includes a wireless base station;
  receiving packets having feedback indicating a congestion level experienced by the downlink packets from the downstream node of the cellular network, wherein the congestion level includes congestion experienced within the downstream node of the cellular network and congestion experienced by the downlink packets between the cellular network gateway and the downstream node;
  inserting a declaration of an expected downstream congestion level into outer headers of the received downlink packets, wherein the declaration is based on the feedback received from the downstream node, and wherein the declaration of the expected downstream congestion level includes remaining path congestion information and is to be used to inform downstream nodes of the cellular network of the expected downstream congestion level, wherein inserting the declaration of the expected downstream congestion level into the outer headers includes inserting the declaration of the expected downstream congestion level into one of a General Packet Radio Service (GPRS) Tunneling Protocol (GTP) headers and outer IP headers;
  detecting based on the feedback whether there is at least one of (a) a malicious flow, (b) a misbehaving user, (c) an aggressive source of traffic, and (d) an overloaded node in the network; and
  forwarding, through a GTP tunnel, the downlink packets toward the downstream user device, with the headers that indicate not explicit congestion notification capable transport as inner headers, and with the outer headers that include the declaration of the expected downstream congestion level.

2. The method of claim 1, wherein the inserting comprises inserting the declaration of the expected downstream congestion level into the outer headers that are indicated as ECN capable transport, and wherein the inner headers of the downlink packets indicate not ECN capable transport.

3. The method of claim 1, wherein the forwarding comprises forwarding the downlink packets through a tunnel, which is not an Internet Protocol (IP) over IP tunnel, wherein the outer header of the downlink packets forwarded through the tunnel indicate Explicit Congestion Notification (ECN) capable transport.

4. The method of claim 1, further comprising subtracting an incoming Explicit Congestion Notification (ECN) rate from the congestion level indicated by the feedback.

5. The method of claim 1, wherein the receiving the packets having the feedback comprises receiving the packets having feedback containing information selected from: (1) a number of packets that were dropped by a base station; (2) a number of packets that were dropped by nodes before the base station; (3) a number of packets that the base station marked to indicate that congestion was experienced; and (4) a number of packets marked by nodes before the base station to indicate that congestion was experienced.

6. A localized congestion exposure sender node configured for localized congestion exposure within a local loop in a cellular network, the localized congestion exposure sender node to be deployed in the local loop between a base station and Internet, the localized congestion exposure sender node comprising:
  a first interface configured to receive downlink packets destined for a downstream user device, and having headers that indicate not explicit congestion notification capable transport, wherein the localized congestion exposure sender node is a cellular network gateway between a downstream node of the local loop and the Internet, and wherein the downstream node includes a wireless base station;
  a second interface configured to receive packets having feedback indicating a congestion level experienced by the downlink packets from the downstream node of the cellular network, wherein the congestion level includes congestion experienced within the downstream node of the cellular network and congestion experienced by the downlink packets between the cellular network gateway and the downstream node; and
  a congestion exposure inserter configured to insert a declaration of an expected downstream congestion level into outer headers of the received downlink packets, wherein the declaration is based on the feedback received from the downstream node, and wherein the declaration of the expected downstream congestion level includes remaining path congestion information and is to be used to inform downstream nodes of the cellular network of the expected downstream congestion level, wherein to insert the declaration of the expected downstream congestion level into the outer headers includes to insert the declaration of the expected downstream congestion level into one of a General Packet Radio Service (GPRS) Tunneling Protocol (GTP) headers and outer IP headers, and
  wherein the sender node is configured to:
    detect based on the feedback whether there is at least one of (a) a malicious flow, (b) a misbehaving user, (c) an aggressive source of traffic, and (d) an overloaded node in the network, and
    forward, through a GTP tunnel, the downlink packets toward the downstream user device, with the headers that indicate not explicit congestion notification capable transport as inner headers, and with the outer headers that include the declaration of the expected downstream congestion level.

7. The node of claim 6, wherein the congestion exposure inserter is configured to insert the declaration of the expected downstream congestion level into the outer headers of the downlink packets that are indicated as Explicit Congestion Notification (ECN) capable transport, and wherein the inner headers of the downlink packets indicate not ECN capable transport.

8. The node of claim 6, wherein the sender node is configured to forward the downlink packets through a tunnel, which is not an Internet Protocol (IP) over IP tunnel, and wherein the outer headers of the downlink packets forwarded through the tunnel indicate Explicit Congestion Notification (ECN) capable transport.

9. The node of claim 6, further comprising a policer configured to subtract an incoming Explicit Congestion Notification (ECN) rate received through the first interface from the congestion level indicated by the feedback.

10. The node of claim 6, further comprising a policer configured to detect an aggressive source by detecting that flows for several users connected to the source all cause a high Explicit Congestion Notification (ECN) rate.

11. The node of claim 6, wherein the network node comprises one of a Serving Gateway (S-GW) and a Packet Data Network Gateway (PDN-GW).

* * * * *